(12) United States Patent
Rieser (10) Patent No.: US 11,142,341 B2
(45) Date of Patent: Oct. 12, 2021

(54) TOWING VEHICLE

(71) Applicant: GOLDHOFER AG, Memmingen (DE)

(72) Inventor: Martin Rieser, Kempten (DE)

(73) Assignee: GOLDHOFER AG, Memmingen (DE)

( * ) Notice: Subject to any disclaimer, the term of this patent is extended or adjusted under 35 U.S.C. 154(b) by 522 days.

(21) Appl. No.: 16/086,117

(22) PCT Filed: Mar. 17, 2017

(86) PCT No.: PCT/EP2017/056401
§ 371 (c)(1),
(2) Date: Sep. 18, 2018

(87) PCT Pub. No.: WO2017/158163
PCT Pub. Date: Sep. 21, 2017

(65) Prior Publication Data
US 2020/0298998 A1 Sep. 24, 2020

(30) Foreign Application Priority Data
Mar. 18, 2016 (DE) ............... 10 2016 204 542.3

(51) Int. Cl.
*B64F 1/22* (2006.01)
*F15B 1/027* (2006.01)
*F15B 11/20* (2006.01)

(52) U.S. Cl.
CPC .............. *B64F 1/227* (2013.01); *F15B 1/027* (2013.01); *F15B 11/20* (2013.01)

(58) Field of Classification Search
CPC .. B64F 1/227; B64F 1/225; B64F 5/00; B64F 5/50; F15B 1/022; F15B 1/027; F15B 2211/625; F15B 2211/212; F15B 2211/20
See application file for complete search history.

(56) References Cited

U.S. PATENT DOCUMENTS 3,042,130 A * 7/1962 Wiebe .................... B64F 1/227
  180/14.1
4,036,384 A   7/1977 Johnson
(Continued)

FOREIGN PATENT DOCUMENTS

CA      2687433        6/2015
CN    203127150 U      8/2013
(Continued)

OTHER PUBLICATIONS

German Application No. 10 2016 204 542.3, Search Report dated Mar. 6, 2017.
(Continued)

*Primary Examiner* — Thomas E Lazo
(74) *Attorney, Agent, or Firm* — Kilpatrick Townsend & Stockton LLP (57) ABSTRACT

The invention relates to a towing vehicle (100) for manoeuvring aeroplanes without using tow bars, the towing vehicle (100) comprising a coupling device (122/124) for gripping and lifting the nose wheel of the aeroplane to be manoeuvred. According to the invention, the towing vehicle (100) comprises a pressure store (176), in which operating fluid is stored under pressure, a release initiation device (178), which can be actuated manually by an operator and which in a release initiation position connects the pressure store (176) to a release device (180), and the release device (180), which is configured and intended, upon manual transfer of the release initiation means (178) into the release initiation position by the operator, initially to lower the nose wheel of the aeroplane automatically until it stands on the travel surface, simply by means of the pressure energy stored in the pressure store (176) and the potential energy of the nose wheel load, and only subsequently to release the nose wheel.

16 Claims, 7 Drawing Sheets

(56) References Cited

U.S. PATENT DOCUMENTS

| | | | | |
|---|---|---|---|---|
| 4,225,279 | A | * | 9/1980 | Boyer .................... B64F 1/227 414/428 |
| 4,632,625 | A | | 12/1986 | Schuller et al. |
| 4,911,603 | A | * | 3/1990 | Pollner .................... B64F 1/22 414/428 |
| 4,911,604 | A | * | 3/1990 | Pollner .................... B64F 1/22 414/428 |
| 4,917,563 | A | * | 4/1990 | Pollner .................. B64F 1/227 414/428 |
| 4,917,564 | A | | 4/1990 | Pollner et al. |
| 4,923,253 | A | * | 5/1990 | Pollner .................. B60T 11/10 303/7 |
| 4,950,121 | A | | 8/1990 | Meyer et al. |
| 5,259,572 | A | * | 11/1993 | Franken ................. B64F 1/227 244/50 |
| 5,336,037 | A | * | 8/1994 | Curten .................... B64F 1/22 414/429 |
| 5,655,733 | A | | 8/1997 | Roach |
| 8,515,594 | B2 | * | 8/2013 | Perry .................... G06F 11/30 701/2 |
| 2003/0165375 | A1 | | 9/2003 | Johansson |
| 2008/0083851 | A1 | | 4/2008 | Perry et al. |
| 2014/0161579 | A1 | | 6/2014 | McElroy |
| 2015/0353300 | A1 | | 12/2015 | Grossman |

FOREIGN PATENT DOCUMENTS

| | | |
|---|---|---|
| CN | 104002986 A | 8/2014 |
| CN | 204623852 U | 9/2015 |
| DE | 3318077 | 11/1984 |
| DE | 3732645 | 9/1988 |
| DE | 3732664 | 9/1988 |
| DE | 3732647 | 4/1989 |
| DE | 3732663 | 4/1989 |
| DE | 4127828 | 2/1993 |
| DE | 69013175 | 2/1995 |
| DE | 19734238 | 2/1998 |
| DE | 202012101864 U1 | 8/2013 |
| GB | 818752 | 8/1959 |
| RU | 2271316 | 3/2006 |

OTHER PUBLICATIONS

International Application No. PCT/EP2017/056401, International Search Report and Written Opinion dated Jun. 9, 2017.
Chinese Application No. 201780027957.7, Chinese Office Action dated May 27, 2021, No English translation available, 9 pages.

* cited by examiner

TOWING VEHICLE

DESCRIPTION

The invention relates to a towing vehicle for manoeuvring aeroplanes without using tow bars, comprising a substantially U-shaped chassis, at least one front axle, the wheels of which are assigned to the base limb of the U shape, at least one rear axle, the wheels of which are each assigned to one of the two side limbs of the U shape, a receiving chamber, enclosed by the chassis and comprising a receiving opening formed between the two free ends of the side limbs of the U shape, and a coupling device for gripping and lifting a nose wheel of an aeroplane which is to be manoeuvred.

Towing vehicles of this type are used for example to shift aeroplanes from the parking position thereof at the terminal back to the apron after passengers have embarked, the doors have been closed, and the passenger boarding bridge has been withdrawn. Further, aeroplanes may be moved towards the runway or to maintenance halls by means of towing vehicles of this type. Tow-bar-free towing vehicles, which grip and lift the nose wheel of the aeroplane to be manoeuvred, have the advantage over tow bar haulers that they themselves only need to have a comparatively low weight, since in addition to the inherent weight thereof the load of the nose wheel is also transmitted onto them, increasing the traction thereof on the travel surface.

To couple a towing vehicle of this type to an aeroplane, the towing vehicle travels, receiving opening first, up against the nose wheel of the aeroplane until this nose wheel is arranged in the receiving chamber. When the receiving opening has been sealed by means of two pivot arms, the nose wheel is clamped between an end plate, arranged on the base limb of the U shape, and two holding plates, arranged on the pivot arms, by actuating a retraction device. In addition, a hold-down means also acts on the nose wheel from above, in such a way that it is securely held at three portions of the circumference thereof. Subsequently, the nose wheel can be lifted by means of a lifting device so as to produce a connection state in which the aeroplane can be moved by means of the towing vehicle.

All of this also contributes to the towing vehicle according to the invention.

As a result of the numerous power devices required for the coupling process (for pivoting the pivot arms, for retracting the pivot arms, for holding down the nose wheel, for lifting the nose wheel), it is easy to see that in conventional tow-bar-free towing vehicles there is the problem that, in the case of a technical defect in the towing vehicle, it is not so simple to release the nose wheel again. This is a problem in particular because only a brief timespan is available for the release. Specifically, in so far as possible, the aeroplane should be prevented from missing the take-off slot assigned thereto and having to wait for the next take-off slot, since this could lead to delays of up to an hour or more, resulting in the passengers possibly missing connecting flights, business appointments or the like. This pressure of time places the driver of the towing vehicle under enormous stress, and this in turn increases the risk that in his haste he may accidentally carry out the numerous interventions required for releasing the nose wheel in the wrong order or not at the desired speed. In addition, it may happen that, for at least one of the interventions required for emergency release, namely opening the pivot arms, the driver of the towing vehicle has to place himself in the dangerous area, in other words in the region of the receiving opening or even inside the receiving chamber, in which the nose wheel of the aeroplane is actually still arranged clamped between the end plate and the holding plate at this moment.

Therefore, the object of the present the invention is to provide remedy in this context.

This object is achieved according to the invention by a tow-bar-free towing vehicle which further comprises a pressure store, in which operating fluid is stored under pressure, as well as a release initiation device, which can be actuated manually by an operator and which in a release initiation position connects the pressure store to a release device, and the release device, which is configured and intended, upon manual transfer of the release initiation means into the release initiation position by the operator, initially to lower the nose wheel of the aeroplane automatically until it stands on the travel surface, simply by means of the pressure energy stored in the pressure store and the potential energy of the nose wheel load, and only subsequently to release the nose wheel.

The central idea of the present invention is to provide a pressure store which, in the event of system failure in the towing vehicle, serves as an energy source, the energy of which, alongside the potential energy of the nose wheel load, is sufficient to be able to carry out the release process completely, reliably, upon manual actuation of the release initiation device by an operator. It is thus ensured that the semiautomatic emergency release can be carried out not only in the event of failure of an individual system of the towing vehicle, for example the control system of the coupling device or the operating fluid supply means, but also in the event of complete system failure of the towing vehicle.

If the system failure occurs when the nose wheel is raised, the nose wheel is initially lowered using the potential energy of the nose wheel load, before the nose wheel is actually released. By contrast, if the system failure occurs at a moment when the nose wheel has not yet been lifted, the lowering of the nose wheel using the potential energy of the nose wheel load can be omitted, and the actual release of the nose wheel can be started directly.

In particular a gas or a liquid is suitable as an operating fluid, for example pressurised air or hydraulic fluid, in particular hydraulic oil. The operating fluid supply means may for example be formed by a gear pump.

So as to be able to prevent the nose wheel from undesirably lowering itself automatically, a blocking valve, which can be opened by supplying fluidic pressure to the control terminal thereof, may be arranged in a lifting line which leads to at least one fluid-actuable power device of a lifting arrangement of the coupling device. In the blocking position thereof, this blocking valve may prevent the discharge of operating fluid from the at least one power device assigned to the lifting arrangement. To make it possible to lower the nose wheel, it may however be provided that the release initiation means connects the pressure store to the control terminal of the blocking valve in the release initiation position.

When the blocking valve has been opened by supplying the fluidic pressure of the pressure store to the control terminal thereof, the operating fluid stored in the fluid-actuable power device of the lifting arrangement is driven out of the power device under the effect of the nose wheel load, causing the nose wheel to be lowered. In this context, simply the flow resistance at the operating fluid terminal of the power device of the lifting arrangement is sufficient to ensure that the nose wheel is lowered at a sufficiently low speed for this not to be perceived as unpleasant by the passengers of the aeroplane. The flow resistance of the lifting line may further contribute to this effect.

At this point, it should be noted that the blocking valve arranged in the lifting line is actuated only by way of the pressure of the operating fluid stored in the pressure store. Since the operating fluid is substantially incompressible if it is a liquid, for example a hydraulic oil, the actuation of the blocking valve involves substantially no flow of fluid (aside from possible leakage flows).

So as to be able to limit the lowering speed of the nose wheel to a pleasant and comfortable value, it is further proposed for a throttle means, which limits the flow speed of the operating fluid, to be provided in the lifting line.

The at least one fluid-actuable power device of the lifting arrangement may be a power device which acts one-sidedly, in particular a power device which only acts in the lifting direction, since the flow of operating fluid in the other direction of action, in particular the lowering direction, is brought about under gravity by the nose wheel load.

In a development of the invention, it may further be provided that, in the release initiation position, the release initiation means further connects the pressure store to a further blocking valve, which can be biased into a blocking position by fluidic pressure prevailing in the lifting line and can be transferred into an open position if a predetermined value of the fluidic pressure prevailing in the lifting line is undershot, the further blocking valve, in the open position thereof, connecting the pressure store to at least one fluid-actuable power device of a gripping arrangement of the coupling device. As a result, it can be ensured that the nose wheel can only actually start to be released by the gripping device when the nose wheel has been completely lowered and the pressure in the lifting line has decreased as a result.

A bias control terminal of the further blocking valve may be directly fluidically connected to the lifting line in a constructionally simple manner, for example in that a branch line is provided which branches off from the lifting line and leads to a bias control terminal of the further blocking valve. In this context, the branch line may preferably branch off from the lifting line at a point thereof which is arranged upstream from the blocking valve in the discharge flow direction away from the lifting arrangement.

In this connection, the aforementioned throttle valve may take on another further function. Specifically, it may ensure that the pressure in the branch line falls to a value which makes it possible to transfer the further blocking valve into the open position thereof only when the nose wheel has also actually been completely lowered. For this purpose, it is advantageous if the throttle valve in the lifting line is arranged downstream, in the discharge flow direction away from the lifting arrangement, from the point at which the branch line branches off from the lifting line.

In a manner known per se, in the towing vehicle according to the invention, the gripping arrangement of the coupling device may still comprise at least one first fluid-actuable power device for pivoting at least one pivot arm of the gripping arrangement or/and at least one second fluid-actuable power device for bringing the at least one pivot arm towards or/and removing the at least one pivot arm from the base limb of the U shape or/and at least one third fluid-actuable power device for holding down the nose wheel of the aeroplane.

The at least one third fluid-actuable power device for holding down the nose wheel of an aeroplane, also referred to hereinafter as a "hold-down power device" for short, may be formed by a spring-biased power device which acts one-sidedly. In particular, the hold-down means assigned to the hold-down power device may be biased, under the effect of the spring bias, into a lower state, from which it can be lifted by contact with the nose wheel moved against the end plate by the retraction device. In this context, operating fluid is displaced out of the hold-down power device. Advantageously, for this purpose, a blocking valve assigned to the hold-down power device has to be opened by supplying pressurised fluid to a control terminal in a targeted manner. When this blocking valve closes after the supply of pressurised fluid to the control terminal is completed, the hold-down means cannot be lifted further. In the state coupled to the nose wheel of the aeroplane, this ensures that the nose wheel cannot undesirably be released from the grip of the gripping device.

Even in the event of system failure, the blocking valve assigned to the hold-down power device is in this blocked state. To make it possible to release the nose wheel of the aeroplane, the hold-down power device therefore initially has to be unblocked. This can be brought about for example in that the pressure store, after the further blocking valve is transferred into the open position thereof, is connected to the control terminal of the blocking valve of the hold-down power device.

The actuation of the blocking valve of the hold-down power device also takes place only by way of the pressure of the operating fluid stored in the pressure store. Thus, in this case too, if a pressurised liquid is used, for example a hydraulic oil, the actuation of the blocking valve involves substantially no flow of fluid (aside from possible leakage flows).

Preferably, the blocking valve assigned to the hold-down power device is arranged directly on the hold-down power device, so as to be able to keep the fluid line volumes arranged in between as low as possible.

The at least one power device assigned to the retraction device may preferably be formed by a fluid-actuable power device which acts two-sidedly. This makes it possible both to retract the pivot arms actively by means of the retraction device, so as to clamp the nose wheel between the end plate and the holding plates attached to the pivot arms, and to extend them actively, so as to prepare them for the next coupling process. In connection with the semiautomatic emergency release according to the invention of the nose wheel, it is sufficient to transfer the at least one power device assigned to the retraction device into a freely displaceable state. This is required in preparation for opening the pivot arms, since the nose wheel is clamped between the end plate and the holding plates attached to the pivot arms, and the clamping force thus exerted on the pivot arms by the nose wheel does not make it possible for them to overcome a knee lever mechanism of the pivot device.

So as to ensure, after the nose wheel of the aeroplane is coupled to the towing vehicle, that the nose wheel cannot undesirably release itself of its own accord from the grip of the gripping device, a blocking valve is assigned to the at least one power device assigned to the retraction device, and prevents relaxation of the retraction device, in other words extension movement of the pivot arms, and thus release of the nose wheel. Analogously to the blocking valve of the hold-down device, the blocking valve of the retraction power device can also be actuated by the pressure of the pressurised fluid stored in the pressure store. This may be brought about for example in that the pressure store is connected to the control terminal of the blocking valve of the retraction power device after the further blocking valve is transferred into the open position thereof. As a result of this actuation, the retraction power device may, under the effect of the force by which the nose wheel is clamped between the end plate and the holding plates attached to the pivot arms, be extended until the nose wheel no longer exerts any force on the holding plates attached to the pivot arms.

The blocking valve of the retraction power device is also actuated only by way of the pressure of the operating fluid stored in the pressure store. Thus, in this case too, if a pressurised liquid is used, for example a hydraulic oil, the actuation of the blocking valve involves substantially no flow of fluid (aside from possible leakage flows). The fluid volume moved in connection with the extension movement originates from the normal operation fluid circuit.

The at least one power device assigned to the pivot arms may also preferably be formed by a fluid-actuable power device which acts two-sidedly. This makes it possible both actively to close and actively to open the pivot arms. As mentioned above, it is advantageous if the power device assigned to at least one of the pivot arms is connected to the pivot arm assigned thereto via a knee lever mechanism. As a result, even if a power device is switched to be powerless or is powerless as a result of a system failure, the pivot arms can be prevented from pivoting of their own accord, potentially causing the receiving opening undesirably to open of its own accord and to release the nose wheel of the aeroplane. As mentioned previously above, the force exerted by the nose wheel, clamped between the end plate and the holding plates of the pivot arms, on the pivot power device via the retraction device additionally prevents the possibility of unintentionally overcoming the knee lever mechanism.

Equally, in a development of the invention, it is possible for the pressure store to be connected to the at least one pivot power device after the further blocking valve is transferred into the open position thereof. As a result, the pressure of the operating fluid stored in the pressure store is present at the pivot power device, but the pivot arms can only be opened once the nose wheel has extended the retraction power device sufficiently that the knee lever mechanism can be overcome. The pivot arms are subsequently opened using the pressure energy stored in the pressure store. Since in this context operating fluid flows from the pressure store to the pivot power device, the storage volume has to be dimensioned large enough that the pivot arms can be opened completely, in such a way that the release of the nose wheel can reliably be ensured.

In connection with the present invention, at least one fluid-actuable power device may be formed by a piston-cylinder unit. Preferably, all fluid-actuable power devices may be formed by piston-cylinder units.

So as to be able to ensure that the pressure store can always provide sufficient pressure energy so as to be able to carry out the semiautomatic emergency release process, in a development of the invention it is proposed that, in a normal operation position, the release initiation means connects the pressure store to an operating fluid supply means. This ensures that the pressure store is always filled to the highest pressure value which occurs in the course of the receiving process. It is easy to appreciate that a higher pressure value is required for lifting the nose wheel of an A380 than for lifting the nose wheel of an A319.

Finally, according to the invention, it may be provided that the release initiation means comprises a manually actuable valve.

Hereinafter, the invention is described in greater detail by way of an embodiment, with reference to the accompanying drawings, in which.

In FIGS. 1 to 5 and 5a, a towing vehicle according to the invention is denoted as a whole as 100. The towing vehicle 100 comprises a substantially U-shaped chassis 102 comprising a driver's cab 104. The wheels 106 of a front axle 108 of the towing vehicle 100 are assigned to a base limb 102a of the U shape of the chassis 102. Analogously, the wheels 110 of a rear axle 112 of the towing vehicle 100 are each assigned to one of the side limbs 102b of the U shape of the chassis 102. The two side limbs 102b together with the base limb 102a enclose a receiving chamber 114, which has a receiving opening 116 at the rear end of the towing vehicle 100.

A coupling device 118 is arranged in the receiving chamber 114, and serves to grip and lift (see FIG. 6) a nose wheel 120 arranged in the receiving chamber 114. The coupling device 118 comprises a lifting device 122 and a gripping device 124, the construction and functionality of which are described in greater detail hereinafter. The energy required for travel operation of the towing vehicle 100 and for operating the coupling device 118 in normal operation is supplied by a drive unit (not shown) of the towing vehicle 100.

The gripping device 124 comprises two retraction power devices 128, which are attached to a frame 130 of the gripping device 124. The frame 130, and together therewith the entire gripping device 124, can be lifted (see FIG. 4) by means of the lifting device 122 (see FIG. 4) or lowered (see FIGS. 1 to 3) onto the travel surface F (see FIG. 6). For this purpose, the lifting device 122 comprises two lifting power devices 132, which act on the chassis 102 at one end and on the frame 130 at the other end.

At parts 128a, which are movable relative to the frame 130, of the retraction power devices 128, a pivot device 134 is arranged in each case. Each pivot device 134 comprises a pivot arm 136, to which a holding plate 138 is attached, the functionality of which is explained in greater detail hereinafter. The pivot arm 136 of each pivot device 134 may be pivoted between a pivoted-out position (shown in solid lines in FIGS. 5 and 5a; see also FIG. 1) and a pivoted-in position (shown in chain-dot-dotted lines in FIGS. 5 and 5a; see also FIG. 2). For this purpose, the associated pivot arm 136 is connected to a pivot power device 142 via a knee lever mechanism 140.

Figure 1:
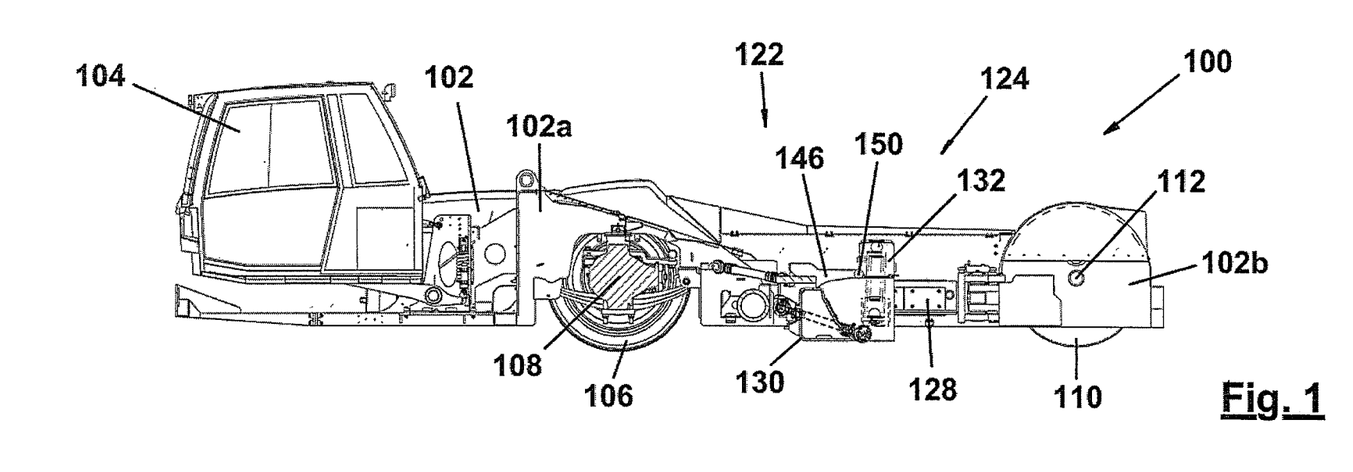
FIG. 1 is a partially sectional side view of a towing vehicle according to the invention, the gripping device being in the pivoted-out, extended and lowered state.
Figure 2:
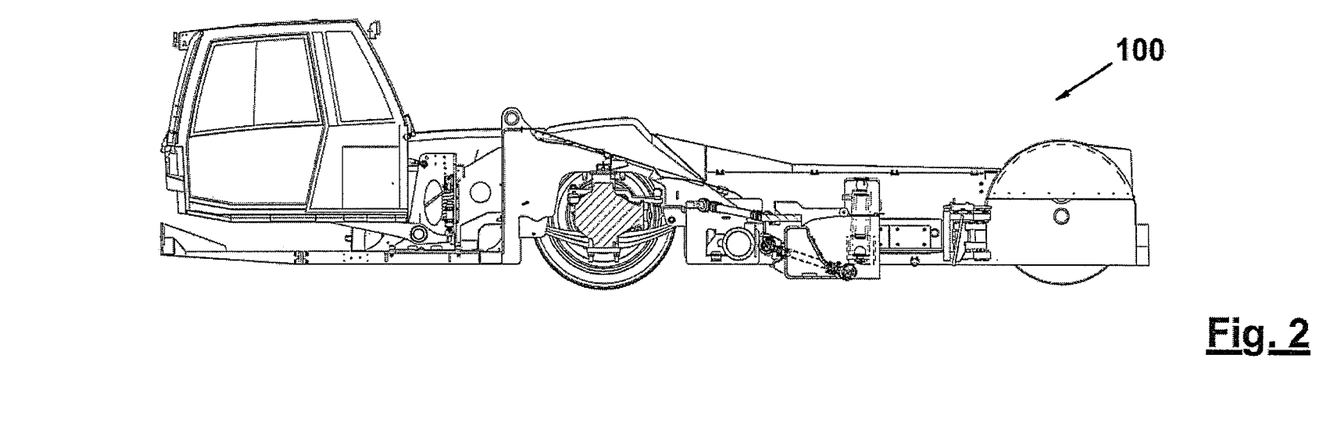
FIG. 2 is a view similar to FIG. 1, but with the gripping device being in a pivoted-in, extended and lowered state.
Figure 3:
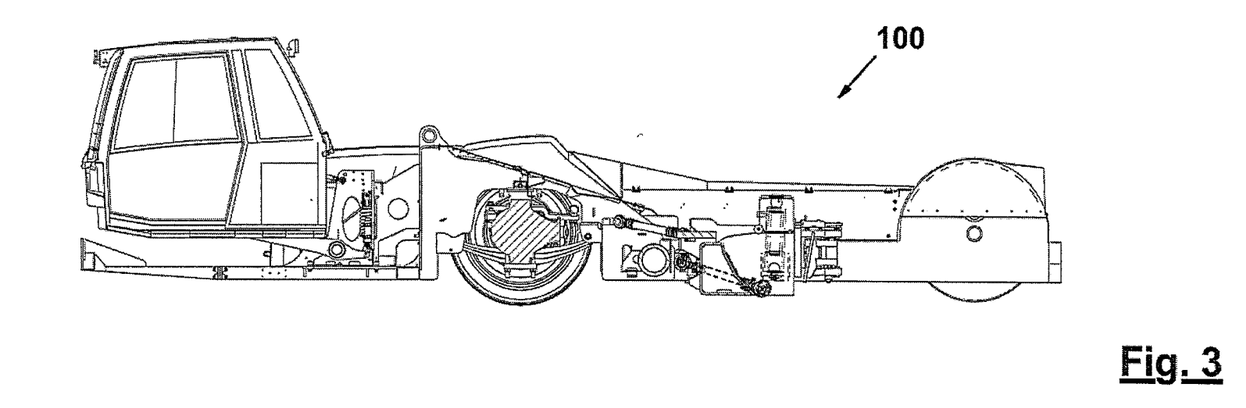
FIG. 3 is a view similar to FIG. 1, but with the gripping device being in a pivoted-in, retracted and lowered state.
Figure 4:
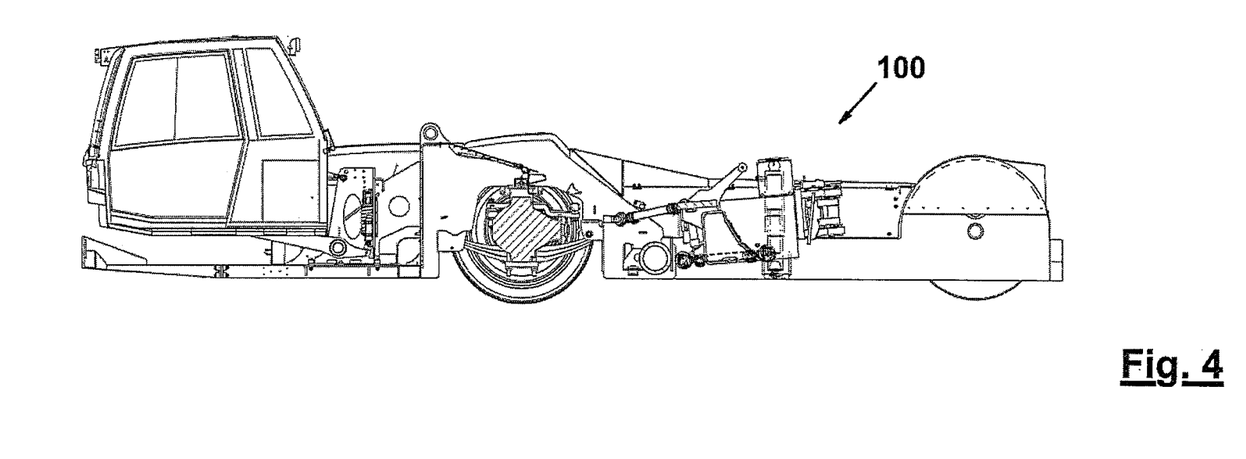
FIG. 4 is a view similar to FIG. 1, but with the gripping device being in a pivoted-in, retracted and raised state.
Figure 5:
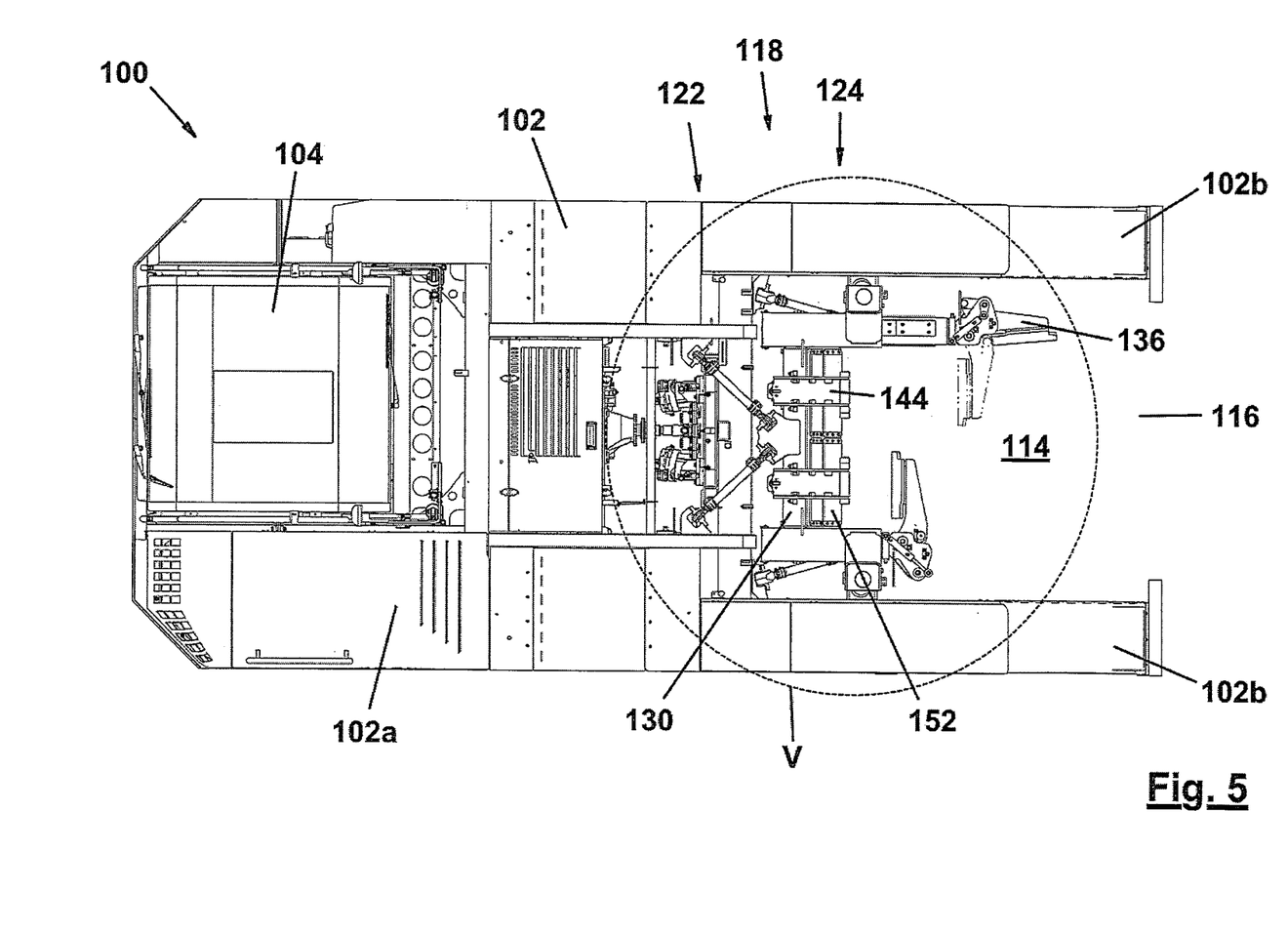
FIG. 5 is a plan view of the towing vehicle of FIGS. 1 to 4.
Figure 5A:
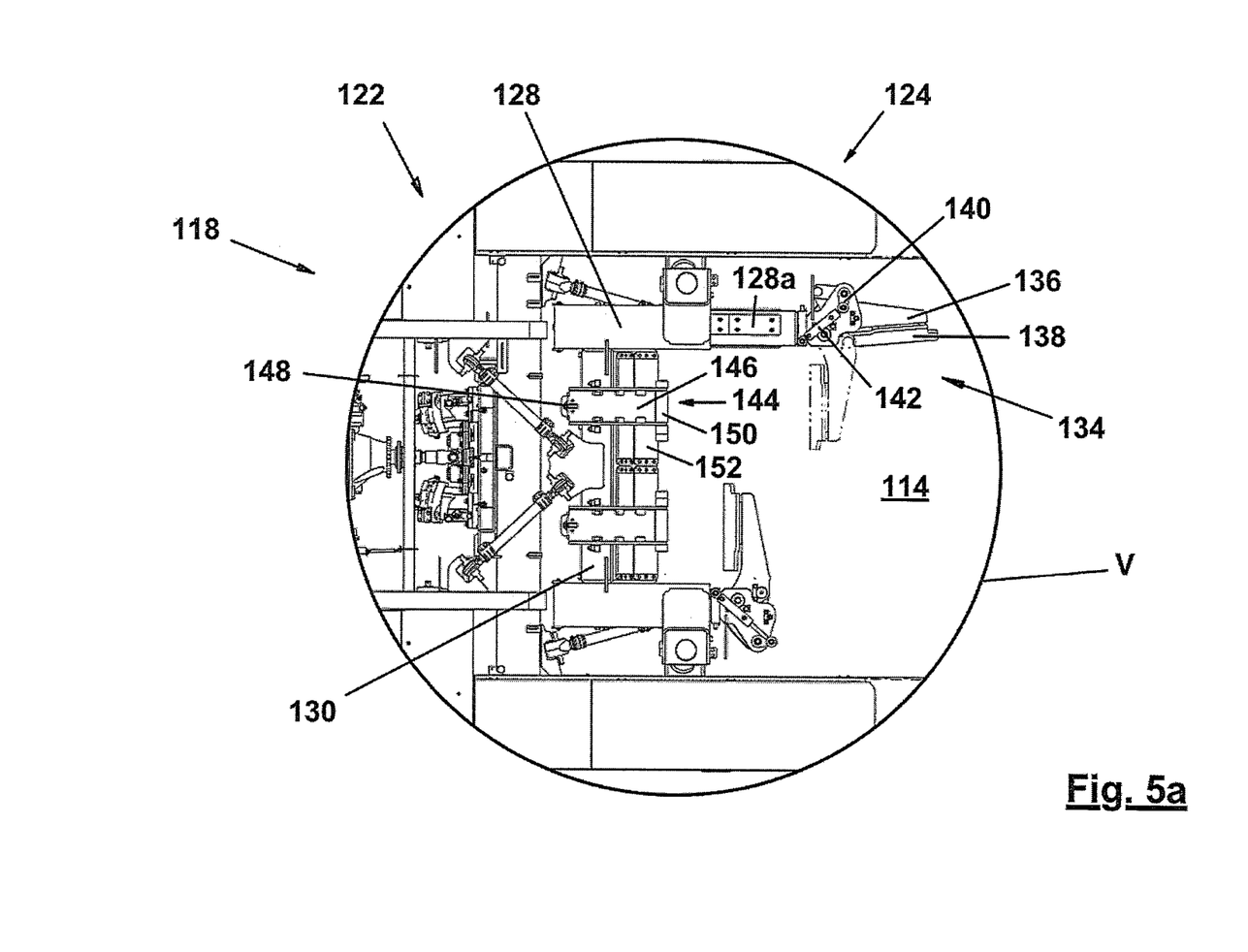
FIG. 5a is an enlarged view of the detail V in FIG. 5.

Further, each of the pivot devices 134 can be adjusted, by means of the retraction power device 128 assigned thereto, between an extended position (shown above in FIGS. 5 and 5a; see also FIG. 2) and a retracted position (shown below in FIGS. 5 and 5a; see also FIG. 3).

It should also be added that two hold-down devices 144 are further arranged (see also FIG. 6) on the frame 130 of the gripping device 124. Each of the hold-down devices 144 comprises a double lever 146 formed as a rocker, on one end of which a hold-down power device 148 acts and on the other end of which a roller 150 is arranged, by means of which the hold-down device 144 acts on the nose wheel 120 or 120' of the respectively coupled aeroplane.

Hereinafter, the coupling process of the nose wheel 120 of an aeroplane to the towing vehicle 100 using the gripping device 124 and the lifting device 122 is to be described with reference to FIGS. 1 to 7.

For this purpose, the towing vehicle 100 travels up against the aeroplane backwards, until the nose wheel 120 is arranged in the receiving chamber 114 between the two side limbs 102b of the towing vehicle 100, and preferably even collides with a rear end wall 152, arranged on the frame 130, of the receiving chamber 114.

When the towing vehicle 100 has come to a standstill, the driver of the towing vehicle 100 can initiate the coupling process, for example by pressing a corresponding button (not shown) in the driver's cab 104. It should be noted that the brakes of the towing vehicle 100 are released during the actual coupling process described hereinafter, in such a way that the towing vehicle 100 can move relative to the aeroplane.

As a result of the initiation of the coupling process, initially the two pivot arms 136 are pivoted by means of the pivot power devices 142 in such a way that the receiving opening 116 is closed, in such a way that the nose wheel 120 can no longer leave the receiving chamber 114. For this purpose, the two pivot power devices 142 which act two-sidedly, on the side of the piston 142b remote from the piston rod 142a, are loaded with operating fluid via the lines 154. The operating fluid displaced on the other side of the piston 142b is thus discharged via the lines 156 to a reservoir (not shown) for operating fluid. Since the pivot arms 136 are connected to the pivot power devices 142 via a self-inhibiting knee lever mechanism 140, no blocking valve needs to be assigned to the pivot power devices 142 in order to hold the pivot arms 136 in the closed position.

Subsequently, the pivot arms 136 are retracted towards the end wall 152 by means of the retraction power devices 128 until the nose wheel 120 is positioned against both the end wall 152 and the holding plates 138 of the pivot arms 130 and clamped between these with a predetermined force (see also FIG. 6). For this purpose, the two retraction power devices 128 which act two-sidedly, on the side of the piston 128b remote from the piston rod 128a, are loaded with operating fluid via the lines 158. The operating fluid displaced on the other side of the piston is thus discharged via the lines 160 to the reservoir (not shown) for operating fluid.

During this retraction movement at the latest, but usually earlier while the towing vehicle 100 is approaching the aeroplane, the nose wheel 120 additionally travels up against one or more hold-down means 144 and lifts them. The hold-down means 144 are biased towards the travel surface F by means of spring-biased hold-down power devices 148. In this context, fluidic pressure is supplied to the hold-down power devices 148 via a line 162, opens the blocking valves 164 of the hold-down power devices 148, and thus makes it possible for operating fluid to be displaced out of the hold-down power devices 148. The displaced operating fluid can be discharged via the lines 166. The hold-down means 144, alongside the end plate 152 and the two pivot arms 136 or the holding plates 138 thereof, thus form a third action point for securely gripping the nose wheel 120.

Figure 6:
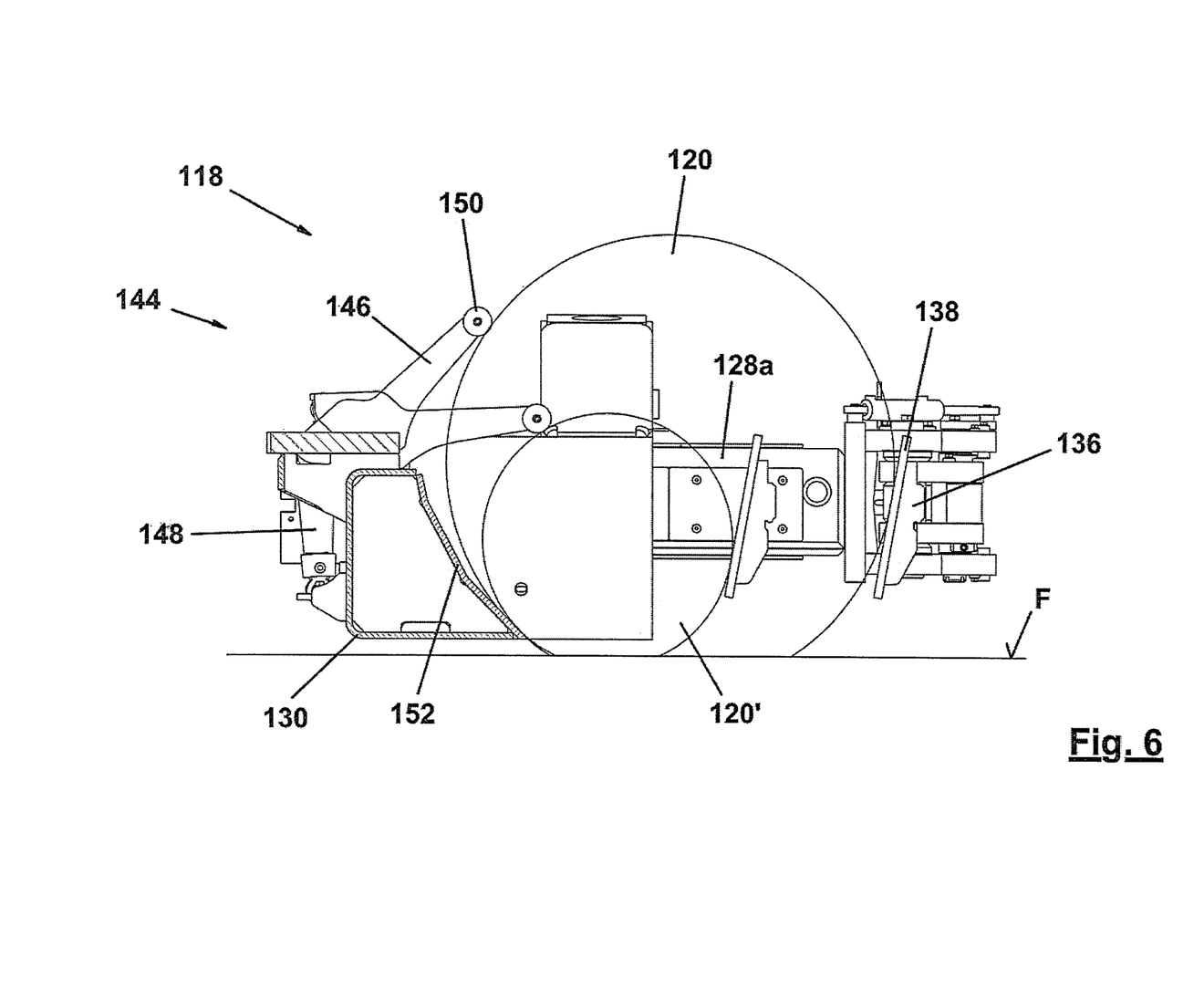
FIG. 6 is an enlarged detail illustrating gripping nose wheels of different diameters.

At this moment, the control system interrupts the receiving process and shows on a display a selection of aeroplane types of which the nose wheel has a diameter corresponding to the diameter of the gripped nose wheel 120 or 120' (see FIG. 6). The diameter of the nose wheel 120 or 120' may for example be determined by means of a length measurement system (not shown) arranged in the retraction power devices 128. When the driver of the towing vehicle has selected and confirmed the associated aeroplane type and additionally pressed the button (not shown) in the driver's cab 104 again, the control system continues the coupling process in that the retraction power devices 128 clamp the nose wheel 120 or 120' between the end wall 152 and the pivot arms 136 with a biasing force predetermined for the associated aeroplane type. For this purpose, an operating fluid supply means (not shown), which may for example be formed by a gear pump, supplies operating fluid of a correspondingly high operating fluidic pressure.

Once the retraction and biasing of the pivot arms 136 is complete, blocking valves 168 prevent the achieved retracted position from being undone again unintentionally.

The nose wheel 120 which is thus securely gripped by the gripping device 124 can now be lifted by means of the lifting power device 132 of the lifting device 122, so as to produce a towing-ready state of the pair formed by the aeroplane and the towing vehicle 100. For this purpose, operating fluid is supplied via a line 170 to the lifting power devices 132 which act one-sidedly. The lifted state is secured by means of a blocking valve 172 (see FIG. 8) arranged in the line 170.

To release the nose wheel 120 in normal operation, upon release initiation being actuated by the operator, for example a release initiation button in the driver's cab 104 being pressed, the control system can carry out the aforementioned sequences in the opposite order and the opposite direction.

Figure 7:
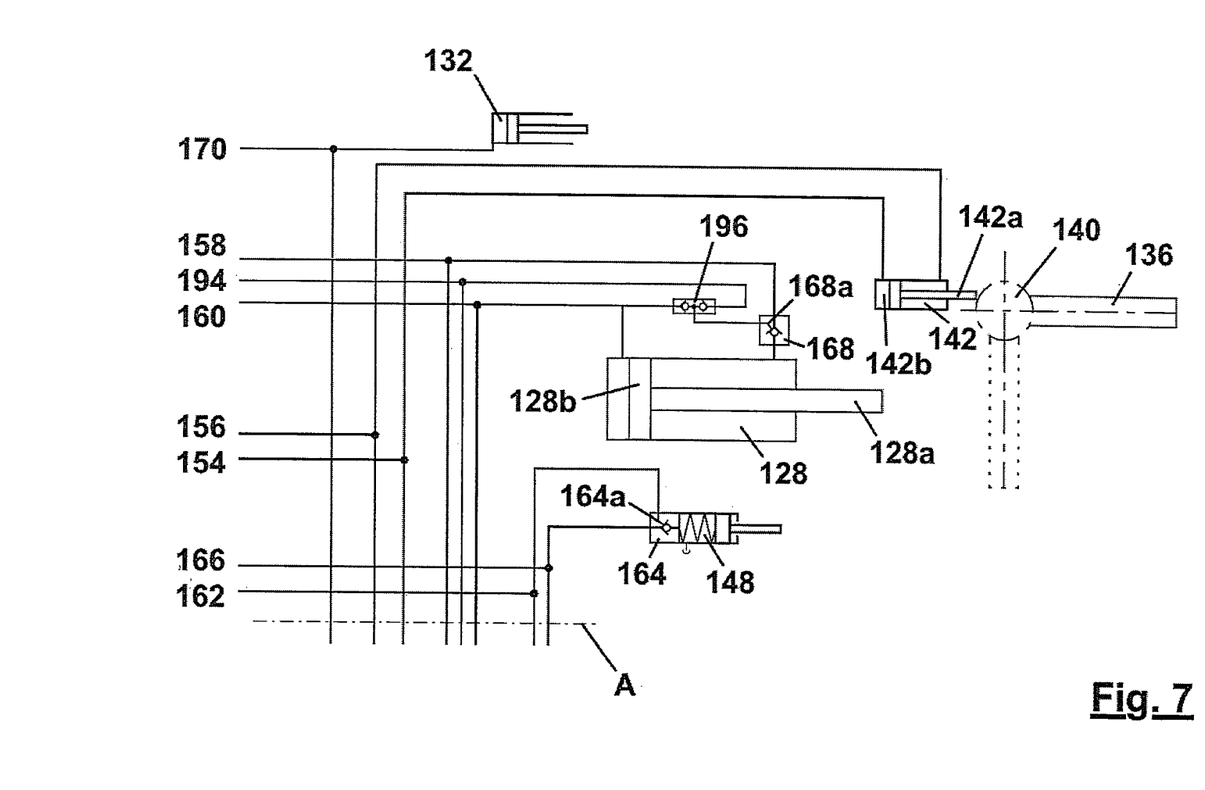
FIG. 7 is a hydraulic circuit diagram illustrating the functionality of the gripping device, only one half of the arrangement, which is symmetrical about the longitudinal axis A of the towing vehicle, being shown for reasons of a more easily comprehensible drawing.
Figure 8:
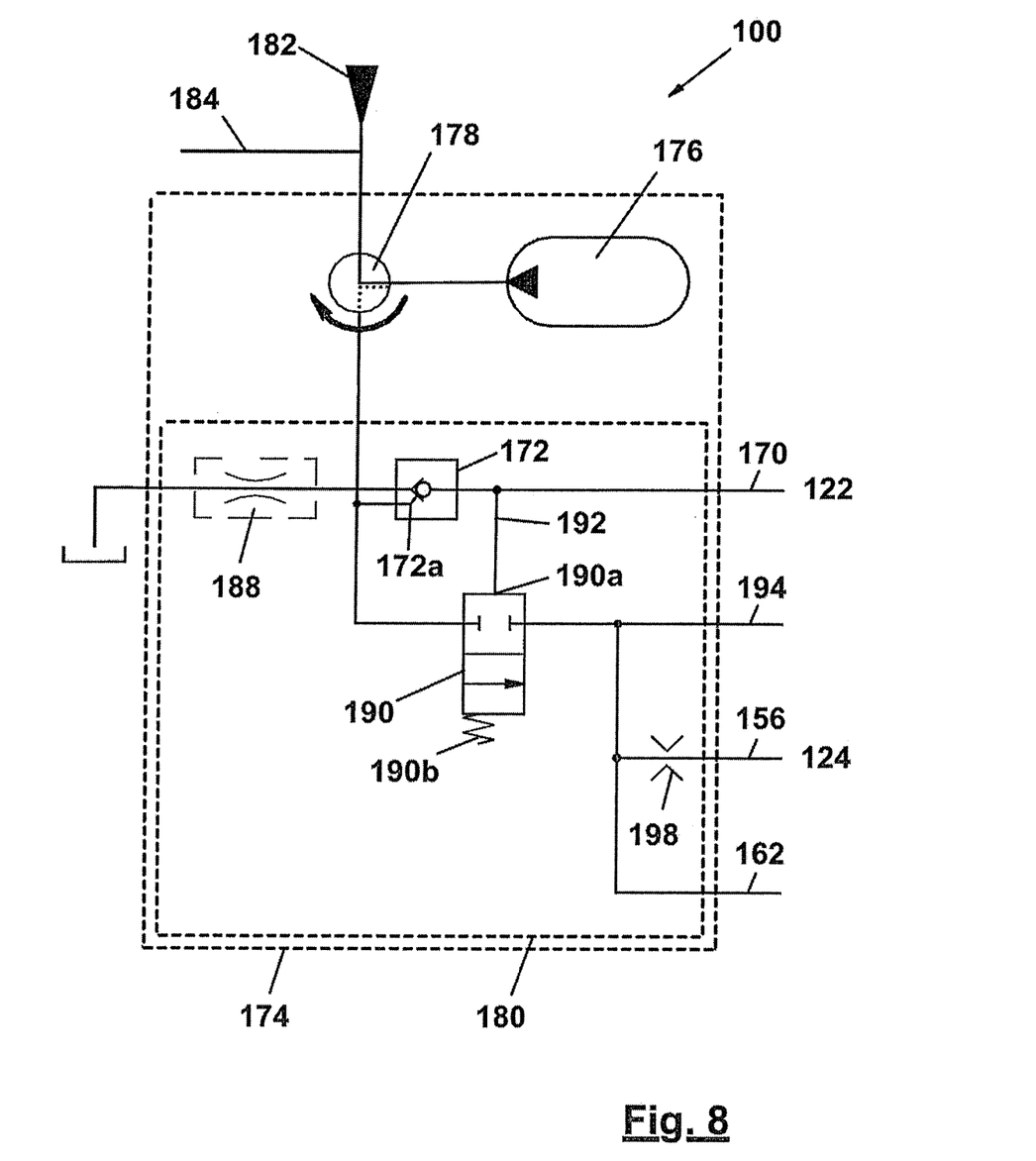
FIG. 8 is a hydraulic circuit diagram illustrating the semiautomatic emergency release operation.

However, if there is a system failure, for example a failure of the addressed control system, the semiautomatic emergency release device 174, described in greater detail below with reference to FIGS. 7 and 8, is used.

The semiautomatic emergency release device 174 comprises a pressure store 176, in which operating fluid is stored under pressure, and a release initiation means 178, which can be actuated manually by an operator and which, in a release initiation position shown in dotted lines in FIG. 8, connects the pressure store 176 to a release device 180. The manually actuable release initiation means 178 may for example be formed by a block ball valve.

So as to be able to ensure that the pressure store 176 is always sufficiently filled with operating fluid for the semiautomatic emergency release operation, in normal operation the release initiation means 178 is in the position shown in solid lines in FIG. 8, in which it connects the pressure store 176 to an operating fluid supply means 182, which additionally supplies a normal operation hydraulic circuit 184 with operating fluid.

On the one hand, in semiautomatic emergency release operation, the operating fluid stored in the pressure store 176 is supplied to the control terminal 172a of the blocking valve, which can be opened by supplying fluidic pressure at the control terminal thereof and which, in the blocking position thereof, prevents the nose wheel 120 from undesirably lowering of its own accord. When the blocking valve 172 has been opened by supplying the fluidic pressure of the pressure store 176 to the control terminal 172a thereof, the operating fluid stored in the lifting power device 132 is driven out of the power device 132 through the line 170 under gravity by means of the nose wheel load, causing the nose wheel to be lowered. So as to limit the lowering speed of the nose wheel 120 to a pleasant and comfortable value, a throttle means 188 is further provided in the line 170, and limits the flow speed of the operating fluid.

On the other hand, the operating fluid stored in the pressure store 176 is passed to a further blocking valve 190, which in FIG. 8 is in the blocking position thereof. In this position, the blocking valve 190 is biased by the fluidic pressure prevailing in the line 170, which pressure is supplied to it at a control terminal 190*a* via a branch line 192 connected to the line 170. It should be noted that the branch line 192 branches off from the line 170 at a point which is arranged upstream from the blocking valve 172 in terms of the discharge direction of the operating fluid out of the power device 132. It can thus be ensured that the actual release of the nose wheel 120 by the gripping device 124 can only be started when the nose wheel 120 has been lowered completely and as a result the pressure in the lifting line 170 has fallen below a predetermined value.

If the pressure in the lifting line 170 has undershot the predetermined value, the blocking valve 190 is transferred by the force of the spring 190*b* into the open position thereof, in which it connects the pressure store 176 to the gripping device 124.

In the event of system failure, the blocking valve 164 assigned to the hold-down power device 148 is in the blocked state thereof. So as to make it possible to release the nose wheel 120 of the aeroplane, the hold-down power device 148 therefore initially has to be unblocked. For this purpose, the pressure store 176 is connected via the line 162 to the control terminal 154*a* of the blocking valve 164 of the hold-down power device 148 when the blocking valve 190 is in the open position thereof. As a result of the blocking valve 164 being opened, the nose wheel 120 gripped in the gripping device can be relaxed somewhat, since the hold-down power device 148 is now freely movable.

In addition, in the event of system failure, the blocking valve 168 assigned to the retraction power device 128 is in the blocking position thereof. The retraction power device 128 does not actually need to be transferred into the extended position thereof to release the nose wheel 120. However, it exerts a clamping force on the knee lever mechanism 140 via the pivot power device 142 arranged on the movable part 128*a* thereof, and as a result the knee lever mechanism 140 cannot be overcome and the pivot arms 136 cannot be pivoted out. So as to make it possible to release the nose wheel 120 of the aeroplane, this clamping force therefore initially has to be eliminated. For this purpose, when the blocking valve 190 is in the open position thereof, the pressure store 176 is connected via a line 194 and a shuttle valve 196 to the control terminal 168*a* of the blocking valve 168 of the retraction power device 128, which is opened by the pressure stored in the pressure store 176. The nose wheel 120 clamped in the gripping device 124 can thus be relaxed, entraining the movable part 128*a* of the retraction power device 128 in the extension direction.

Finally, when the blocking valve 190 is in the open position thereof, the pressure store 176 is also further connected via the line 156 to the pivot power device 142. As a result of the bias of the knee lever mechanism 140, the fluidic pressure present at the pivot power device 142 still cannot cause said power device to pivot the pivot arm 136 assigned thereto. Only when the nose wheel 120 has been fully relaxed as described above is a clamping force no longer exerted on the knee lever mechanism 140, in such a way that the pivot force device 142 can be shortened by the supply of operating fluid from the pressure store 176 and can thus adjust the pivot arm 136 into the pivoted-out position, in which it releases the receiving opening 116, in such a way that the nose wheel 120 can be moved out of the receiving chamber 114.

So as to be able to prevent the pivot arms 136 from suddenly springing out, a shutter 198 which limits the flow speed is arranged in the line 156.

Finally, it should be noted that the hydraulic circuit of the release device 174 can be integrated into the hydraulic circuit (not shown), to implement normal operation, using shuttle valves, for example the shuttle valve 196, and blocking valves, for example blocking valves openable by control pressure, simple check valves and the like.

The invention claimed is:

1. A towing vehicle for manoeuvring aeroplanes without using tow bars, comprising:
   a substantially U-shaped chassis having a U shape,
   at least one front axle, wheels of which are assigned to a base limb of the U shape,
   at least one rear axle, wheels of which are each assigned to a respective one of two side limbs of the U shape,
   a receiving chamber, enclosed by the chassis and comprising a receiving opening formed between two free ends of the side limbs of the U shape,
   a coupling device for gripping and lifting a nose wheel of an aeroplane which is to be manoeuvred, and
   a blocking valve arranged in a lifting line which leads to at least one fluid-actuable power device of a lifting arrangement of the coupling device, wherein the blocking valve can be opened by supplying fluidic pressure to a control terminal of the blocking valve,
   wherein the towing vehicle further comprises:
   a pressure store, in which operating fluid is stored under pressure,
   a release initiation device, which can be actuated manually by an operator and which in a release initiation position connects the pressure store to a release device, and
   the release device, which is configured and intended, upon manual transfer of the release initiation device into the release initiation position by the operator, initially to lower the nose wheel of the aeroplane automatically until it stands on a travel surface, by means of pressure energy stored in the pressure store and potential energy of a load of the nose wheel load, and only subsequently to release the nose wheel,
   wherein the release initiation device connects the pressure store to the control terminal of the blocking valve in the release initiation position.

2. The towing vehicle according to claim 1, wherein a throttle means, which limits a flow speed of the operating fluid, is provided in the lifting line.

3. The towing vehicle according to claim 1 wherein, in the release initiation position, the release initiation device further connects the pressure store to a further blocking valve, which can be biased into a blocking position by fluidic pressure prevailing in the lifting line and can be transferred into an open position if a predetermined value of the fluidic pressure prevailing in the lifting line is undershot, the further blocking valve, in the open position thereof, connecting the pressure store to at least one fluid-actuable power device of a gripping arrangement of the coupling device.

4. The towing vehicle according to claim 3, wherein a branch line is provided which branches off from the lifting line and leads to a bias control terminal of the further blocking valve.

5. The towing vehicle according to claim 4, wherein a throttle valve in the lifting line is arranged downstream, in a discharge flow direction away from the lifting arrangement, from a point at which the branch line branches off from the lifting line.

6. The towing vehicle according to claim 4, wherein the branch line branches off from the lifting line at a point thereof which is arranged upstream from the blocking valve in a discharge flow direction away from the lifting arrangement.

7. The towing vehicle according to claim 3
wherein the gripping arrangement of the coupling device comprises at least one of (i) at least one first fluid-actuable power device for pivoting at least one pivot arm of the gripping arrangement, (ii) at least one second fluid-actuable power device for retracting or extending the at least one pivot arm relative to the base limb of the U shape, or (iii) at least one third fluid-actuable power device for holding down the nose wheel of the aeroplane.

8. The towing vehicle according to claim 7, wherein the gripping arrangement of the coupling device comprises the at least one third fluid-actuable power device for holding down the nose wheel of the aeroplane,
wherein an additional blocking valve, which can be opened by supplying fluidic pressure to a control terminal of the additional blocking valve, is assigned to the at least one third fluid-actuable power device, the control terminal of the additional blocking valve being connected to the pressure store after the further blocking valve is transferred into the open position thereof.

9. The towing vehicle according to claim 7, wherein the gripping arrangement of the coupling device comprises the at least one second fluid-actuable power device for retracting or extending the at least one pivot arm relative to the base limb of the U shape,
wherein an additional blocking valve, which can be opened by supplying fluidic pressure to a control terminal of the additional blocking valve, is assigned to the at least one second fluid-actuable power device, the control terminal of the additional blocking valve being connected to the pressure store after the further blocking valve is transferred into the open position thereof.

10. The towing vehicle according to claim 7, wherein the gripping arrangement of the coupling device comprises the at least one first fluid-actuable power device for pivoting at least one pivot arm of the gripping arrangement,
wherein the pressure store is connected to the at least one first fluid-actuable power device after the further blocking valve is transferred into the open position thereof.

11. The towing vehicle according to claim 1, wherein a gripping arrangement of the coupling device comprises at least one of (i) at least one first fluid-actuable power device for pivoting at least one pivot arm of the gripping arrangement, (ii) at least one second fluid-actuable power device for retracting or extending the at least one pivot arm relative to the base limb of the U shape or, (iii) at least one third fluid-actuable power device for holding down the nose wheel of the aeroplane.

12. The towing vehicle according to claim 11, wherein the gripping arrangement of the coupling device comprises the at least one third fluid-actuable power device for holding down the nose wheel of the aeroplane,
wherein the at least one third fluid-actuable power device for holding down the nose wheel of the aeroplane is formed by a spring-biased power device which acts one-sidedly.

13. The towing vehicle according to claim 11, wherein the gripping arrangement of the coupling device comprises the at least one second fluid-actuable power device for retracting or extending the at least one pivot arm relative to the base limb of the U shape,
wherein the at least one second fluid-actuable power device for retracting or extending the at least one pivot arm is formed by a fluid-actuable power device which acts two-sidedly.

14. The towing vehicle according to claim 11, wherein the gripping arrangement of the coupling device comprises the at least one first fluid-actuable power device for pivoting at least one pivot arm of the gripping arrangement,
wherein the at least one first fluid-actuable power device for pivoting the at least one pivot arm is formed by a fluid-actuable power device which acts two-sidedly.

15. The towing vehicle according to claim 11, wherein the gripping arrangement of the coupling device comprises the at least one first fluid-actuable power device for pivoting at least one pivot arm of the gripping arrangement,
wherein the at least one first fluid-actuable power device is connected to the pivot arm assigned thereto via a knee lever mechanism.

16. The towing vehicle according to claim 1, wherein, in a normal operation position, the release initiation device connects the pressure store to an operating fluid means.

* * * * *